(12) United States Patent
Morita

(10) Patent No.: US 9,722,676 B2
(45) Date of Patent: Aug. 1, 2017

(54) COMMUNICATION CONTROL METHOD, BASE STATION, AND PROCESSOR

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 49 days.

(21) Appl. No.: 14/440,584

(22) PCT Filed: Nov. 1, 2013

(86) PCT No.: PCT/JP2013/079732
§ 371 (c)(1),
(2) Date: May 4, 2015

(87) PCT Pub. No.: WO2014/073487
PCT Pub. Date: May 15, 2014

(65) Prior Publication Data
US 2015/0288426 A1  Oct. 8, 2015

Related U.S. Application Data

(60) Provisional application No. 61/723,020, filed on Nov. 6, 2012.

(51) Int. Cl.
*H04B 7/02* (2017.01)
*H04B 7/06* (2006.01)
(Continued)

(52) U.S. Cl.
CPC .......... *H04B 7/024* (2013.01); *H04B 7/0697* (2013.01); *H04L 5/0023* (2013.01);
(Continued)

(58) Field of Classification Search
None
See application file for complete search history.

(56) References Cited

U.S. PATENT DOCUMENTS

2009/0109907 A1 * 4/2009 Tsai .......................... H04J 4/00
370/329
2010/0208606 A1 * 8/2010 Hoshino ............... H04L 1/0026
370/252
(Continued)

FOREIGN PATENT DOCUMENTS

CN WO 2011097768 A1 * 8/2011 ............. H04B 7/024
JP 2010268524 A 11/2010
(Continued)

OTHER PUBLICATIONS

An Office Action issued by the Japanese Patent Office on Feb. 2, 2016, which corresponds to Japanese Patent Application No. 2014-545691 and is related to U.S. Appl. No. 14/440,584; with statement of relevance.
(Continued)

*Primary Examiner* — Faruk Hamza
*Assistant Examiner* — Cassandra Decker
(74) *Attorney, Agent, or Firm* — Studebaker & Brackett PC

(57) ABSTRACT

A base station is connected to a first user terminal in a mobile communication system that performs spatial multiplexing transmission for the first user terminal and a second user terminal by applying a same radio resource and a same precoder matrix. The base station comprises: a control unit that notifies another base station connected to the second user terminal of a first statistic for each piece of first precoder matrix information fed back from the first user terminal and a second statistic for each downlink radio resource in the first user terminal.

6 Claims, 18 Drawing Sheets

(51) Int. Cl.
  *H04L 25/03* (2006.01)
  *H04L 5/00* (2006.01)
  *H04W 88/08* (2009.01)
  *H04B 7/024* (2017.01)
(52) U.S. Cl.
  CPC ...... *H04L 5/0035* (2013.01); *H04L 25/03904* (2013.01); *H04B 7/0632* (2013.01); *H04B 7/0639* (2013.01); *H04W 88/08* (2013.01)

(56) References Cited

U.S. PATENT DOCUMENTS

| | | | |
|---|---|---|---|
| 2010/0284484 A1* | 11/2010 | Jongren | H04B 7/0639 375/267 |
| 2011/0009125 A1* | 1/2011 | Shin | H04B 7/024 455/452.1 |
| 2011/0103287 A1 | 5/2011 | Ma et al. | |
| 2011/0211482 A1 | 9/2011 | Hoshino et al. | |
| 2012/0163487 A1* | 6/2012 | Koyanagi | H04B 7/0634 375/267 |
| 2012/0307672 A1* | 12/2012 | Liu | H04B 7/024 370/252 |
| 2012/0314787 A1* | 12/2012 | Park | H04B 7/0417 375/260 |
| 2013/0034187 A1* | 2/2013 | Taoka | H04B 7/024 375/296 |
| 2013/0058307 A1* | 3/2013 | Kim | H04B 7/024 370/329 |
| 2013/0115985 A1* | 5/2013 | Davydov | H04B 7/024 455/501 |

FOREIGN PATENT DOCUMENTS

| | | | | |
|---|---|---|---|---|
| JP | WO 2011105213 A1 * | 9/2011 | | H04B 7/024 |
| KR | WO 2011155763 A2 * | 12/2011 | | H04B 7/024 |
| WO | 2011/005048 A2 | 1/2011 | | |
| WO | 2011/083774 A1 | 7/2011 | | |
| WO | 2011097768 A1 | 8/2011 | | |

OTHER PUBLICATIONS

3GPP TSG RAN WG1 #37b; Feedback Design for DLCoMP; R1-092490; Agenda item: 15.2; Jun. 29-Jul. 3, 2009, pp. 1-6.
International Search Report; PCT/JP2013/079732; Jan. 21, 2014.
Written Opinion of the International Searching Authority; PCT/JP2013/079732; Jan. 21, 2014.
3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); pp. 1-194.
The extended European search report issued by the European Patent Office on May 18, 2016, which corresponds to European Patent Application No. 13852441.8-1874 and is related to U.S. Appl. No. 14/440,584.
An Office Action; "Notice of Reasons for Rejection," issued by the Japanese Patent Office on Mar. 28, 2017, which corresponds to Japanese Patent Application No. 2016-227803 and is related to U.S. Appl. No. 14/440,584.

* cited by examiner

FIG. 11
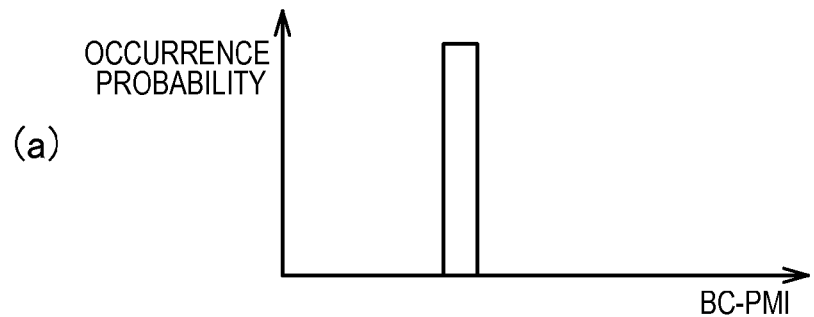
(a)
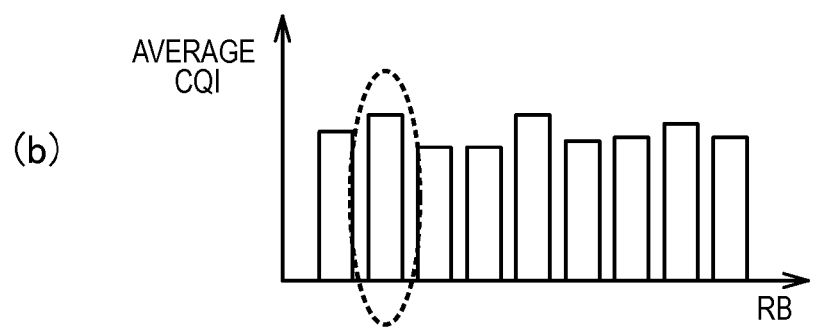
(b)
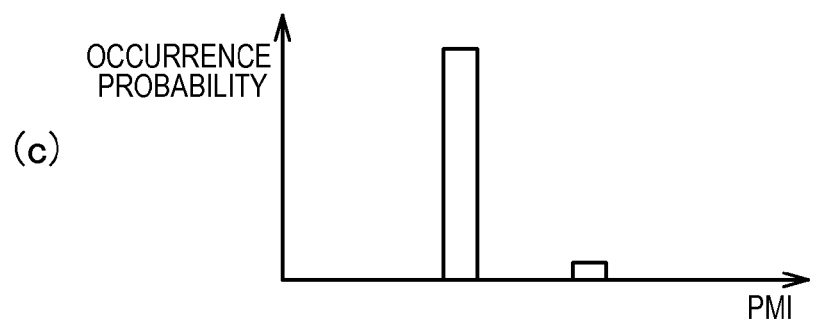
(c)
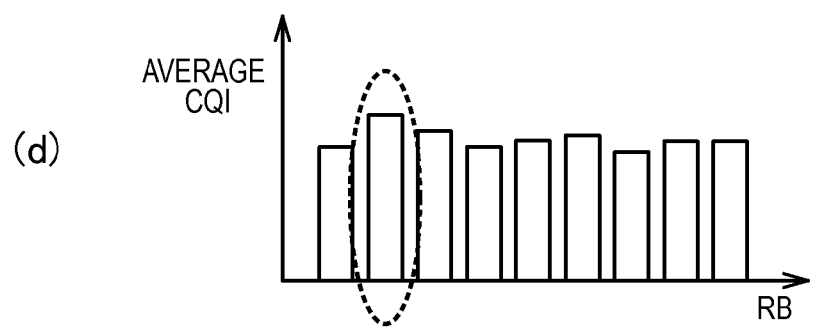
(d)

COMP UE INFORMATION MESSAGE (CONFIGURATION EXAMPLE 1)

COMP UE INFORMATION MESSAGE (CONFIGURATION EXAMPLE 2)

ASSIGNMENT RESERVATION MESSAGE (CONFIGURATION EXAMPLE 1)

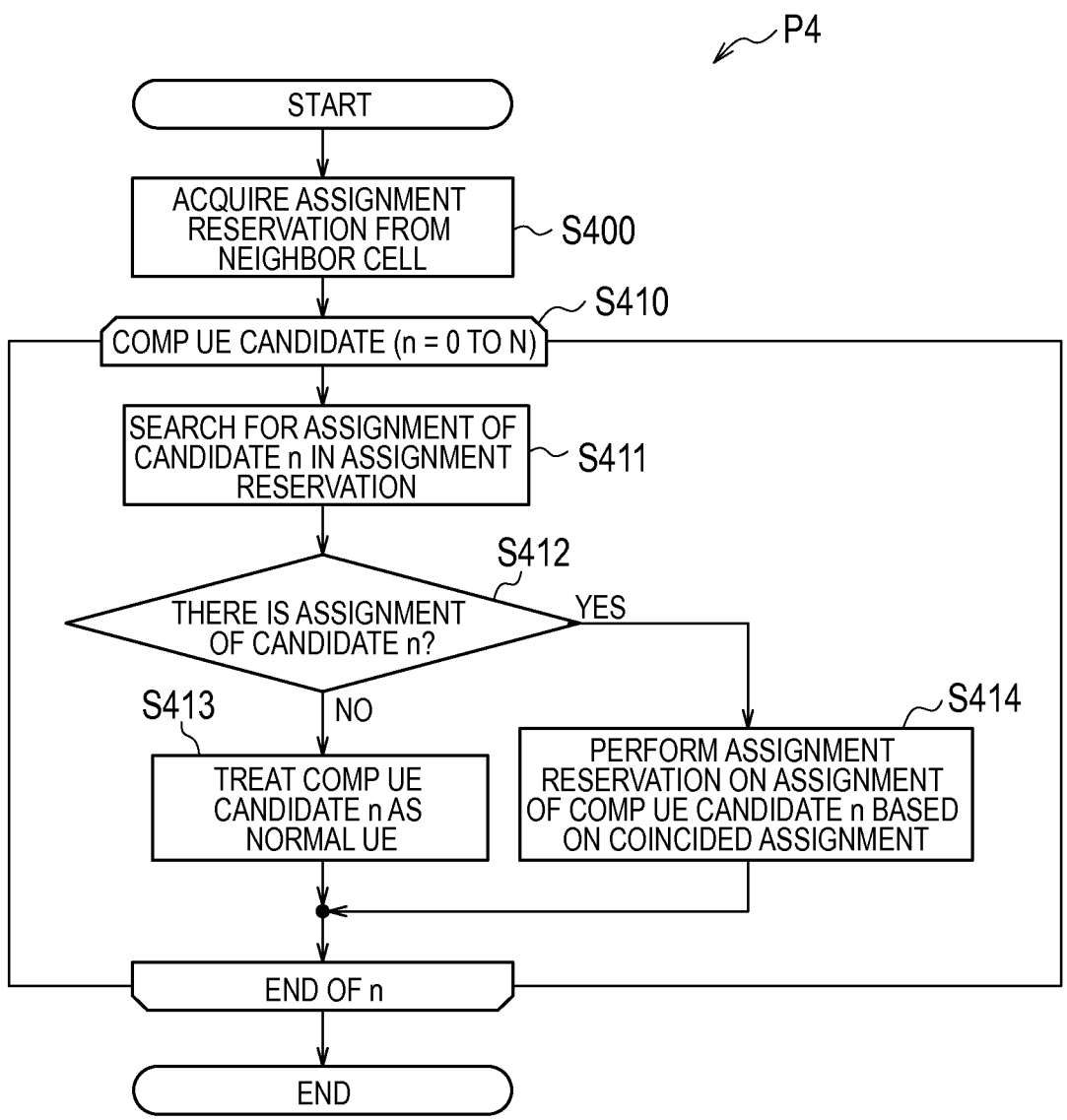

COMMUNICATION CONTROL METHOD, BASE STATION, AND PROCESSOR

TECHNICAL FIELD

The present invention relates to a communication control method, a base station, and a processor that support downlink multi-antenna transmission.

BACKGROUND ART

An LTE system of which the specifications are formulated in 3GPP (3rd Generation Partnership Project), which is a project aiming to standardize a mobile communication system, supports downlink multi-antenna transmission (for example, see Non Patent Document 1). For example, a base station can perform transmission by directing a beam toward one user terminal, and directing a null toward another user terminal.

In order to realize the downlink multi-antenna transmission in an FDD scheme, a user terminal feeds back (notifies) precoder matrix information indicating a precoder matrix to a base station. Furthermore, the precoder matrix determines downlink transmission directionality.

Furthermore, in 3GPP, the standardization of CoMP (Coordinated Multi-Point) is in progress. In the CoMP, an antenna group (a base station) arranged in the same place is positioned as one "point" and a plurality of points communicate with a user terminal in cooperation with one another. A point group that performs cooperative communication with a user terminal by using the same radio resource (time and frequency resource) is called a CoMP cooperating set.

PRIOR ART DOCUMENT

Non Patent Document

Non Patent Document 1: 3GPP technology specifications "TS 36.300 V11. 0. 0 (December, 2011)

SUMMARY OF INVENTION

Meanwhile, in the 3GPP, as a kind of the CoMP, CB (Coordinated Beamforming)-CoMP, in which a plurality of base stations perform spatial multiplexing transmission based on beamforming/null steering in cooperation with one another, is discussed.

However, in the current specifications, there is a problem that there is no scheme for appropriately performing the CB-CoMP.

Therefore, the present invention provides a communication control method, a base station, and a processor, with which it is possible to appropriately perform CB-CoMP.

A communication control method according to one embodiment is a method which performs spatial multiplexing transmission for a first user terminal and a second user terminal by applying a same radio resource and a same precoder matrix in a mobile communication system including a first base station, the first user terminal that is connected to the first base station, a second base station that is adjacent to the first base station, and the second user terminal that is connected to the second base station.

The communication control method comprises a step A of calculating, by the first base station, a first statistic for each piece of first precoder matrix information fed back from the first user terminal and a second statistic for each downlink radio resource in the first user terminal, a step B of notifying, by the first base station, the second base station of the first statistic and the second statistic, a step C of calculating, by the second base station, a third statistic for each piece of second precoder matrix information fed back from the second user terminal and a fourth statistic for each downlink radio resource in the second user terminal, and a step D of comparing, by the second base station, the first statistic with the third statistic, comparing the second statistic with the fourth statistic, and determining whether the spatial multiplexing transmission is possible.

BRIEF DESCRIPTION OF DRAWINGS

FIG. 11 is a diagram for explaining a statistic according to the embodiment.
FIG. 18 is a flow diagram illustrating details of a process P4 illustrated in FIG. 9.

DESCRIPTION OF EMBODIMENTS

Overview of Embodiment

Figure 1:
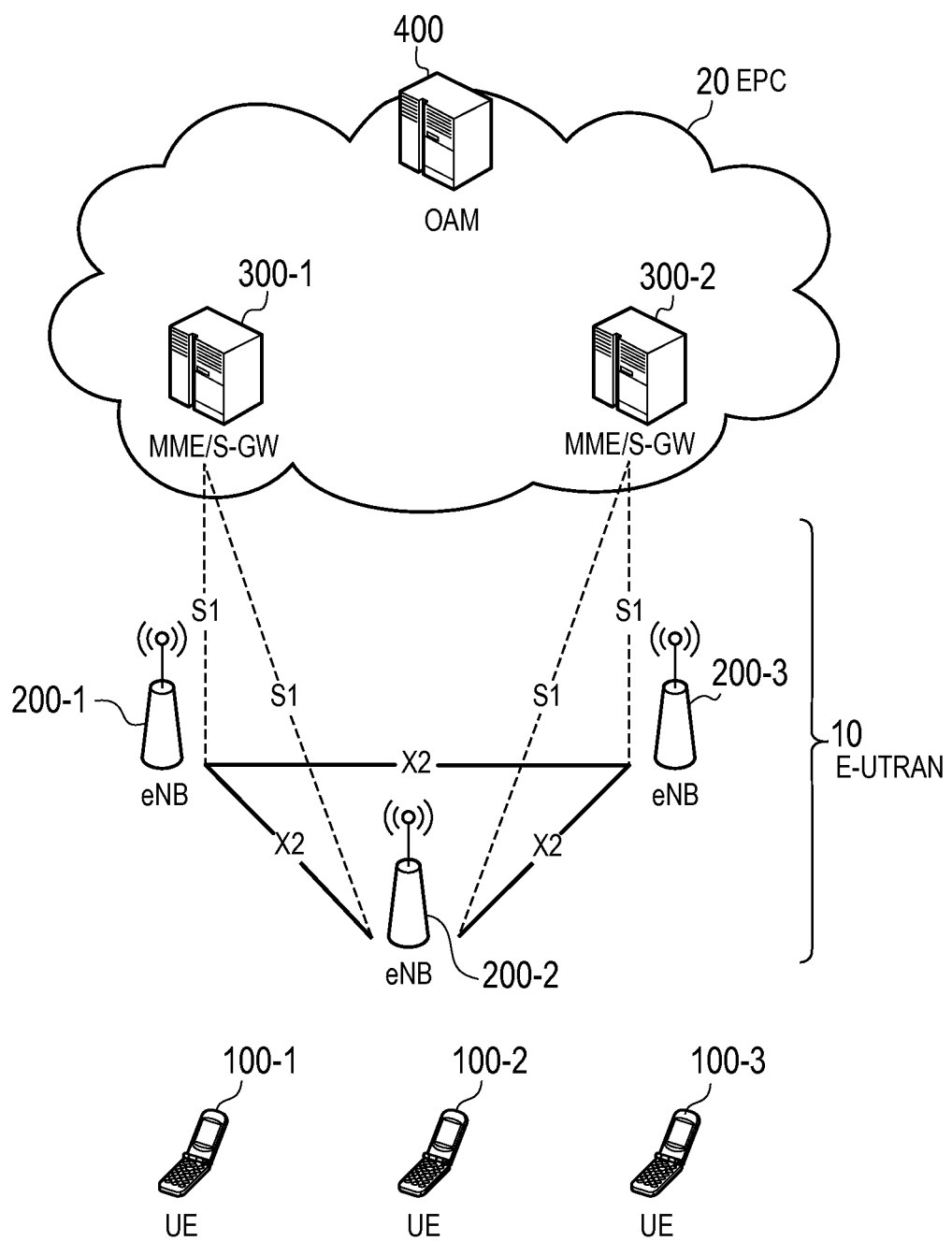
FIG. 1 is a configuration diagram of an LTE system.

A communication control method according to an embodiment is a method for performing spatial multiplexing transmission for a first user terminal and a second user terminal by applying the same radio resource and the same precoder matrix in a mobile communication system including a first base station, the first user terminal that is connected to the first base station, a second base station that is adjacent to the first base station, and the second user terminal that is connected to the second base station.

The communication control method includes a step A of calculating, by the first base station, a first statistic for each piece of first precoder matrix information fed back from the first user terminal and a second statistic for each downlink radio resource in the first user terminal, a step B of notifying, by the first base station, the second base station of the first statistic and the second statistic, a step C of calculating, by the second base station, a third statistic for each piece of second precoder matrix information fed back from the second user terminal and a fourth statistic for each downlink radio resource in the second user terminal, and a step D of comparing, by the second base station, the first statistic with the third statistic, comparing the second statistic with the fourth statistic, and determining whether the spatial multiplexing transmission is possible. In addition, "determining whether the spatial multiplexing transmission is possible" includes determination regarding whether to start the spatial multiplexing transmission as well as determination regarding whether to continue the spatial multiplexing transmission.

According to the aforementioned communication control method, from the standpoint of a feedback situation of the precoder matrix information and a situation of the downlink radio resource, it is checked that the first user terminal and the second user terminal are a pair with high consistency (a pair with high compatibility), and then it is possible to perform the spatial multiplexing transmission (CB-CoMP). Consequently, it is possible to obtain an effect that performance is more reliably improved due to the spatial multiplexing transmission.

On the other hand, from the standpoint of the feedback situation of the precoder matrix information and the situation of the downlink radio resource, when the first user terminal and the second user terminal are a pair with low consistency (a pair with low compatibility), it is not possible to perform the spatial multiplexing transmission. Consequently, it is possible to prevent performance deterioration from occurring due to the spatial multiplexing transmission.

According to the embodiment, the first statistic indicates an occurrence probability for each piece of first precoder matrix information. The third statistic indicates an occurrence probability for each piece of second precoder matrix information. In the step D, when the first precoder matrix information with the highest occurrence probability in the first statistic does not coincide with the second precoder matrix information with the highest occurrence probability in the third statistic, the second base station determines that the spatial multiplexing transmission is not possible.

According to the embodiment, the second statistic indicates communication quality for each downlink radio resource in the first user terminal. The fourth statistic indicates communication quality for each downlink radio resource in the second user terminal. In the step D, when a radio resource with high communication quality in the second statistic does not coincide with a radio resource with high communication quality in the fourth statistic, the second base station determines that the spatial multiplexing transmission is not possible.

According to the embodiment, the communication control method further comprises: when it is determined that the spatial multiplexing transmission is possible in the step D, a step E of ensuring, by the second base station, a radio resource for the spatial multiplexing transmission and notifying the first base station of the ensured radio resource; and a step F of assigning, by the second base station, the ensured radio resource to the second user terminal, and assigning, by the first base station, the radio resource, which has been notified from the second base station, to the first user terminal.

According to the embodiment, the communication control method further comprises: a step G of determining that the spatial multiplexing transmission is not possible when the highest occurrence probability in the first statistic is smaller than a threshold value or when the highest occurrence probability in the third statistic is smaller than the threshold value.

According to the embodiment, in the step C, the second base station calculates the third statistic and the fourth statistic for each of a plurality of second user terminals connected to the second base station, and in the step D, the second base station determines whether the spatial multiplexing transmission with the first user terminal is possible for each of the plurality of second user terminals.

A base station according to the embodiment is a base station which is connected to a first user terminal in a mobile communication system that performs spatial multiplexing transmission for the first user terminal and a second user terminal by applying a same radio resource and a same precoder matrix. The base station comprises: a control unit that notifies another base station connected to the second user terminal of a first statistic for each piece of first precoder matrix information fed back from the first user terminal and a second statistic for each downlink radio resource in the first user terminal.

A processor according to the embodiment is a processor which is provided in a base station that is connected to a first user terminal in a mobile communication system that performs spatial multiplexing transmission for the first user terminal and a second user terminal by applying a same radio resource and a same precoder matrix. The processor notifies another base station connected to the second user terminal of a first statistic for each piece of first precoder matrix information fed back from the first user terminal and a second statistic for each downlink radio resource in the first user terminal.

Embodiment

Hereinafter, with reference to the accompanying drawings, a description will be provided for an embodiment when the present invention is applied to a mobile communication system (an LTE system) configured according to 3GPP standards.

LTE System

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 constitutes a cell and performs radio communication with UE 100 establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM 400 (Operation and Maintenance).

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
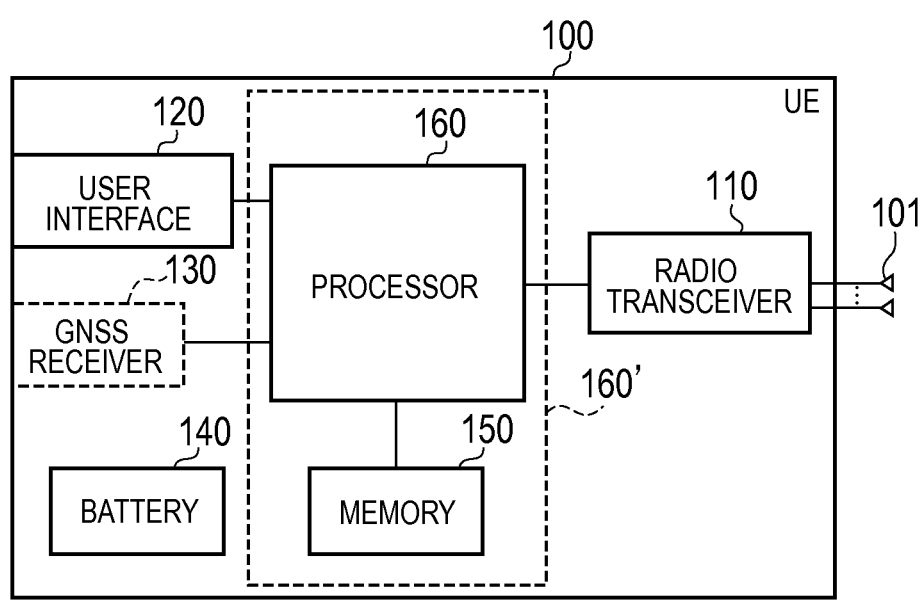
FIG. 2 is a block diagram of UE.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

In the present embodiment, the processor 160 generates channel state information (CSI) on the basis of a signal received by the radio transceiver 110 (particularly, a reference signal), and then feeds back the channel state information to the serving cell or the neighboring cell. The channel state information includes PMI (Precoding Matrix Indicator), RI (Rank Indicator), and CQI (Channel Quality Indicator), for example.

In addition, the memory 150 holds a set (a codebook) of candidates of the PMI, and the processor 160 selects one PMI from the codebook and feeds back the PMI.

An "entire downlink band" or a "subband" is stipulated as the frequency unit (the target frequency band) that is to be fed back, and which one to use is determined in accordance with the instruction from the eNB 200. A subband is a frequency unit obtained by dividing the entire downlink band, and includes the bandwidth of a plurality of resource blocks. The details of the information that is fed back (such as the PMI, the RI, and the CQI) are described later.

Figure 3:
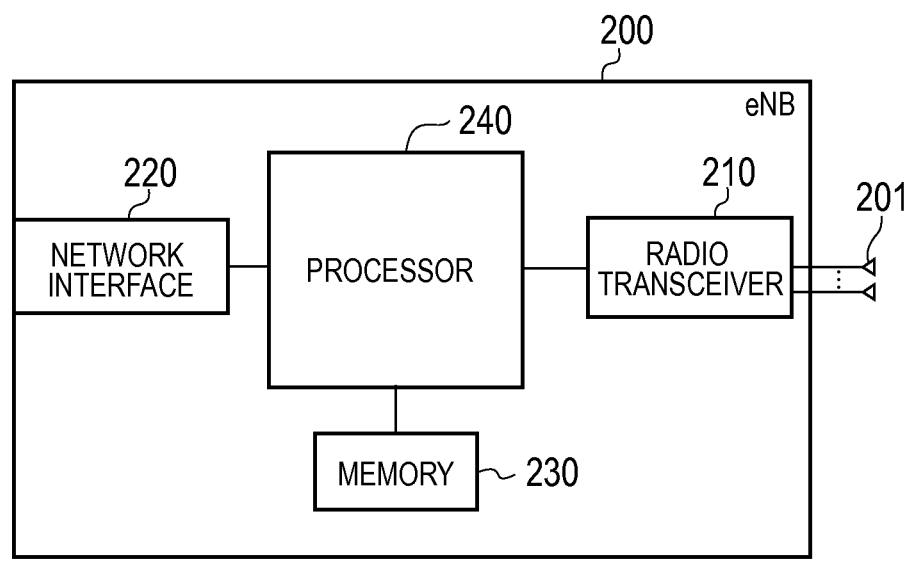
FIG. 3 is a block diagram of eNB.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a control unit.

The antenna 201 and the radio transceiver 210 are used to transmit and receive a radio signal. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
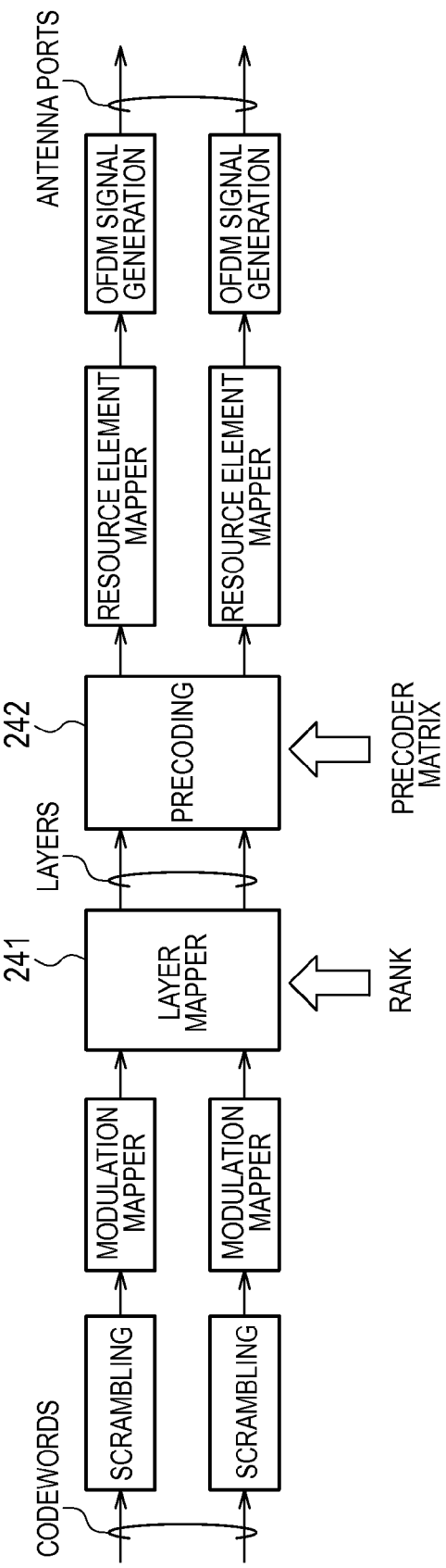
FIG. 4 is a block diagram related to downlink multi-antenna transmission.

In the present embodiment, the processor 240 performs downlink multi-antenna transmission by applying the precoder matrix and the rank. FIG. 4 is a block diagram of the processor 240 related to the downlink multi-antenna transmission. The details of each block are described in 3GPP TS 36.211, for example. However, an overview of each block will be described herein.

As illustrated in FIG. 4, one or two codewords to be transmitted via a physical channel are scrambled, are modulated into a modulation symbol, and then are mapped to a plurality of layers by a layer mapper 241. The codeword is an error correction data unit. The rank (number of layers) is determined on the basis of the RI that is fed back.

A precoder 242 precodes a modulation symbol of each layer by using a precoder matrix. The precoder matrix is determined on the basis of the PMI that is fed back. The precoded modulation symbol is mapped to a resource element, is converted into an OFDM signal of a temporal domain, and is output to each antenna port.

Figure 5:
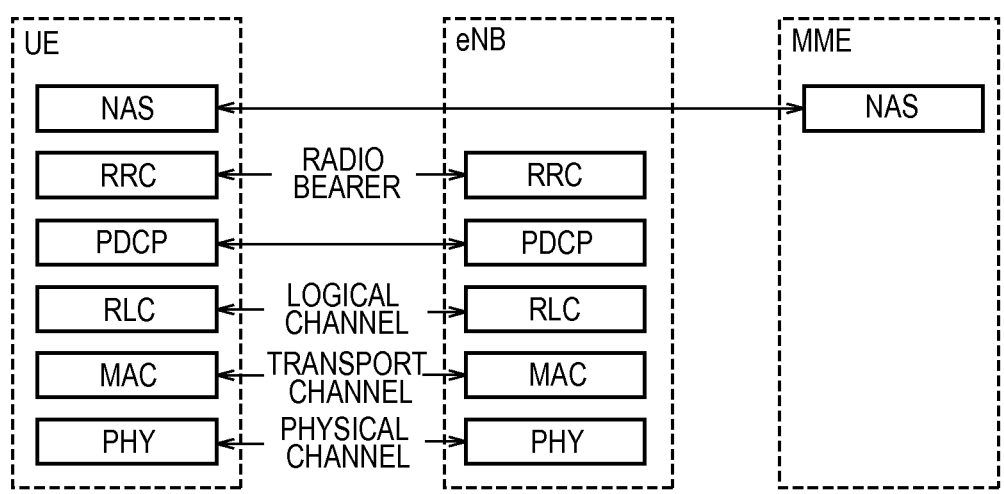
FIG. 5 is a protocol stack diagram of a radio interface in the LTE system.

FIG. 5 is a protocol stack diagram of a radio interface in the LTE system.

As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (RRC Connected State), and otherwise, the UE 100 is in an idle state (RRC Idle State).

A NAS (Non-Access Stratum) layer positioned above the RRC layer performs session management or mobility management, for example.

Figure 6:
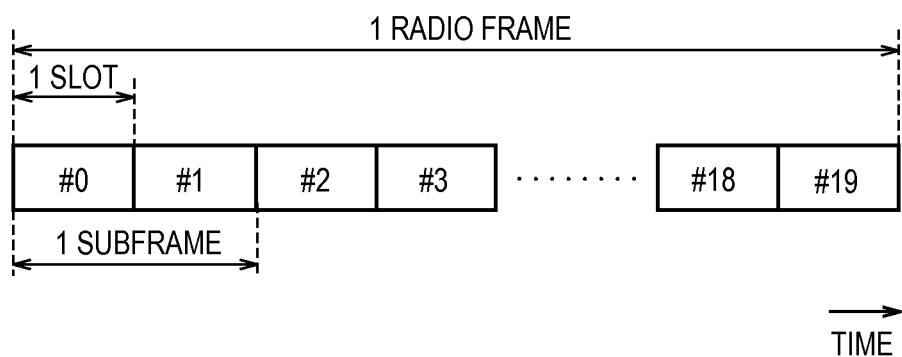
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As a duplex scheme, either an FDD (Frequency Division Duplex) scheme or a TDD (Time Division Duplex) scheme is used. However, in the present embodiment, the FDD scheme is mainly assumed.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, reference signals such as cell-specific reference signals (CRSs) are distributed and arranged.

The PDCCH carries the control information. The control information includes, for example, the uplink SI (Scheduling Information), the downlink SI, and a TPC bit. The uplink SI is information indicating the assignment of uplink radio resources, and the downlink SI is information indicating the assignment of downlink radio resources. The TPC bit is information for instructing an increase or decrease in the uplink transmission power.

The PDSCH carries the control information and/or user data. For example, a downlink data region may be assigned only to the user data, or may be assigned such that the user data and the control information are multiplexed.

In the uplink, both ends, in the frequency direction, of each subframe are control regions mainly used as a physical uplink control channel (PUCCH). Furthermore, the center portion, in the frequency direction, of each subframe is a region mainly used as a physical uplink shared channel (PUSCH).

The PUCCH carries the control information. The control information includes, for example, the CQI, the PMI, the RI, the SR (Scheduling Request), and the ACK/NACK.

The CQI is information (an index) indicating a modulation and coding scheme (that is, recommended MCS), which is preferable to be used in the downlink, based on a downlink reception status.

The PMI is information (an index) indicating a precoder matrix that is preferable to be used in the downlink. In other words, the PMI indicates a precoder matrix in which a beam is directed toward UE that is a transmission source of the PMI. For example, in order for the reception status of the UE 100 to improve, the UE 100 selects the PMI to be fed back to the eNB 200.

The RI is information (an index) indicating a rank that is preferable to be used in the downlink. For example, in order for the rank corresponding to the reception status of the UE 100 to be applicable, the UE 100 selects the PMI to be fed back to the eNB 200.

The SR is information for requesting the assignment of uplink radio resources.

The ACK/NACK is information indicating whether or not the decoding of a signal transmitted via a downlink physical channel (for example, the PDSCH) is successful.

The PUSCH is a physical channel that carries the control information and/or user data. For example, an uplink data region may be assigned only to the user data, or may be assigned such that the user data and the control information are multiplexed.

Operation According to Embodiment

Hereinafter, an operation according to the present embodiment will be described.

(1) Entire Operation

Figure 7:
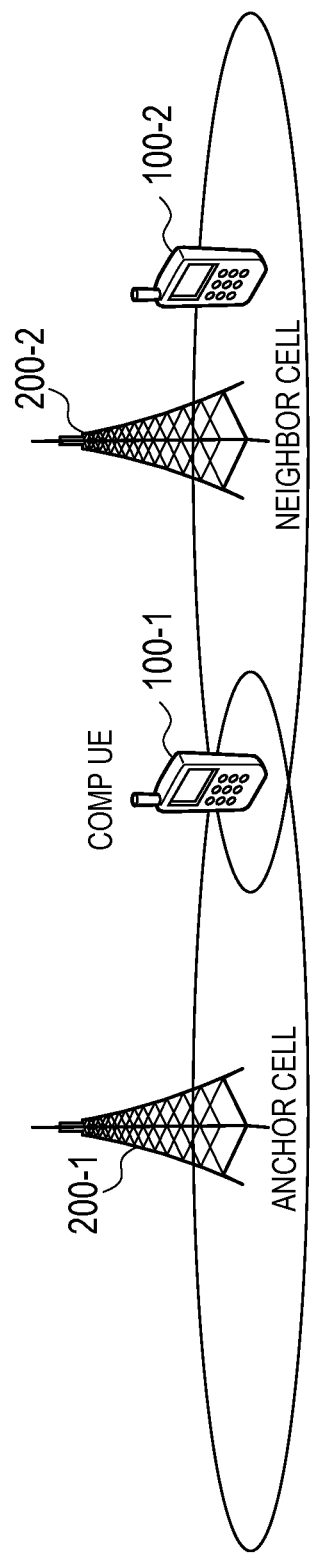
FIG. 7 is a diagram illustrating an operation environment according to an embodiment.
Figure 8:
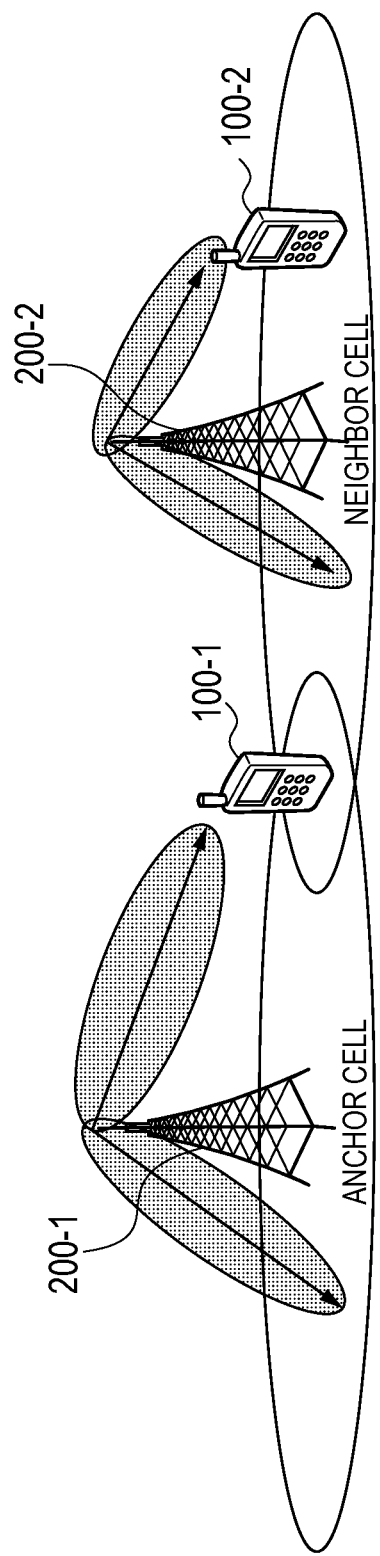
FIG. 8 is a diagram illustrating an operation environment according to the embodiment.

FIG. 7 and FIG. 8 are diagrams illustrating operation environments according to the present embodiment. In FIG. 7 and FIG. 8, eNB 200-1 (a first base station) and eNB 200-2 (a second base station) constitute cells adjacent to each other, and that is, are in the adjacency relation.

As illustrated in FIG. 7, UE 100-1 (a first user terminal) establishes a connection with the cell of the eNB 200-1. That is, the UE 100-1 performs communication by assuming the cell of the eNB 200-1 as the serving cell. FIG. 7 illustrates only one UE 100-1. However, a plurality of UEs 100-1 may establish a connection with the cell of the eNB 200-1.

In the present embodiment, the UE 100-1 is positioned in the boundary region of the respective cells of the eNB 200-1 and the eNB 200-2. In such a case, normally, the UE 100-1 receives the influence of the interference from the cell of the eNB 200-2.

UE 100-2 (a second user terminal) establishes a connection with the cell of the eNB 200-2. That is, the UE 100-2 performs communication by assuming the cell of the eNB 200-2 as the serving cell. FIG. 7 illustrates only one UE 100-2. However, a plurality of UEs 100-2 may establish a connection with the cell of the eNB 200-2.

The eNB 200-1 and the eNB 200-2 perform CB (Coordinated Beamforming)-CoMP (Coordinated Multi Point) in order to improve throughput of the UE 100-1 positioned at the edge of the cell. In the CB-CoMP, the serving cell of the UE 100-1 is called an "anchor cell".

As illustrated in FIG. 8, in the CB-CoMP, the eNB 200-2 acting as a main interference source adjusts transmission directionality such that the influence of the interference to the UE 100-1 is reduced. Specifically, the eNB 200-2 assigns a radio resource, which is equal to that assigned to the UE 100-1, to the UE 100-2, and performs transmission to the UE 100-2 by directing a null to the UE 100-1 and directing a beam to the UE 100-2. In this way, it is possible to spatially multiplex (separate) the UE 100-2 with the UE 100-1.

The UE 100-1, which is an object of the CB-CoMP, performs special feedback in addition to normal feedback (PMI, RI, and CQI) for the eNB 200-1. In the present embodiment, the UE 100-1 feeds back the special PMI to the eNB 200-1.

The normal PMI is information (an index) indicating a precoder matrix in which a beam is directed toward the UE 100-1 at the time of transmission from the eNB 200-1 to the UE 100-1. On the basis of a reference signal and the like that are received from the eNB 200-1, the UE 100-1 feeds back the normal PMI such that a received level from the eNB 200-1 is improved.

The special PMI is information (an index) indicating a precoder matrix in which a null is directed toward the UE 100-1 at the time of transmission from the eNB 200-2 to the UE 100-1. Such PMI is called BC (Best Companion)-PMI. On the basis of a reference signal and the like that are received from the eNB 200-2, the UE 100-1 feeds back the BC-PMI such that a received level (that is, an interference level) from the eNB 200-2 is reduced. In the present embodiment, the BC-PMI, which is fed back from the UE 100-1, corresponds to first precoder matrix information.

Meanwhile, the UE 100-2 performs normal feedback (PMI, RI, and CQI) for the eNB 200-2. In the present embodiment, the PMI, which is fed back from the UE 100-2, corresponds to second precoder matrix information.

Figure 9:
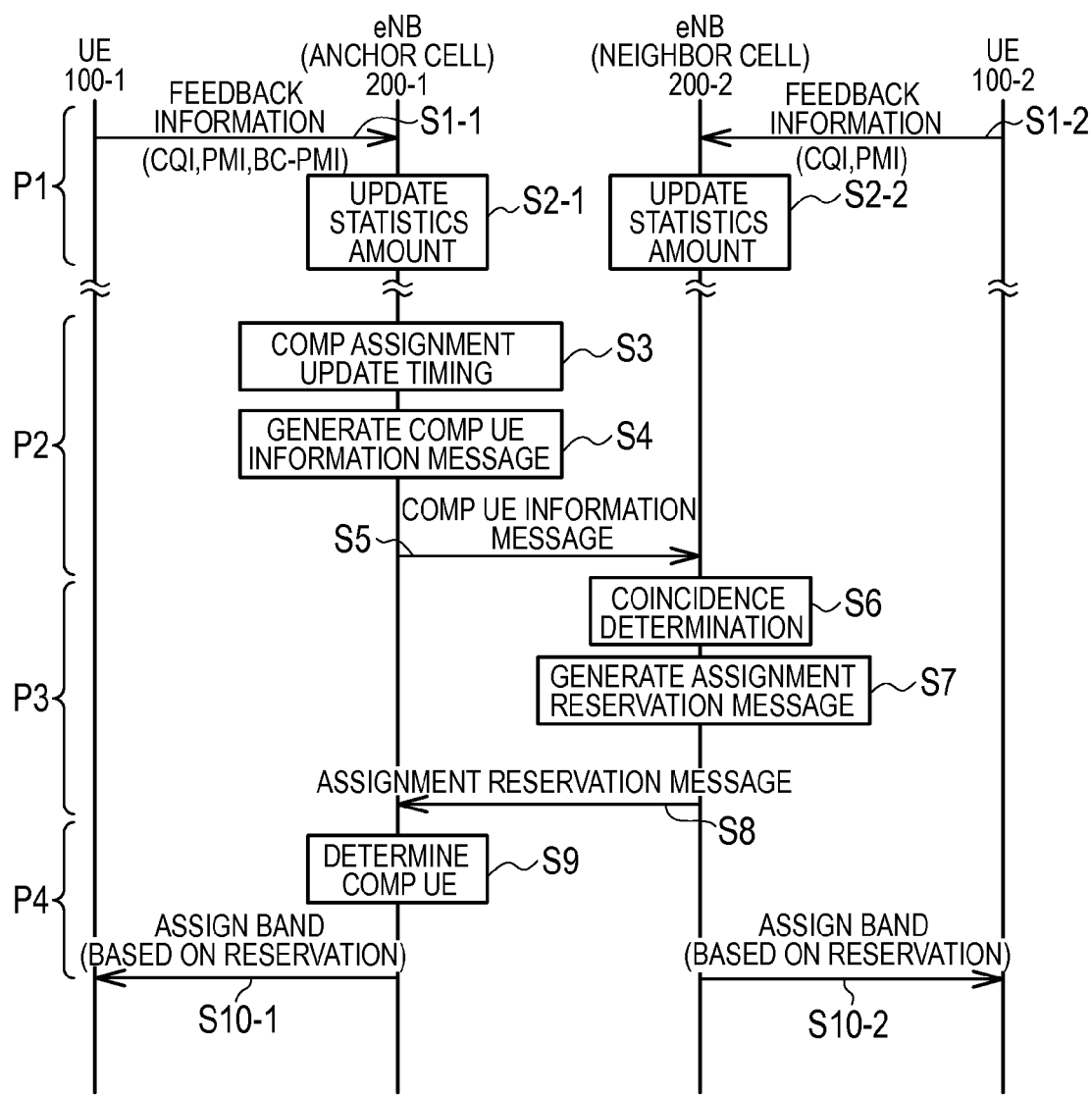
FIG. 9 is an operation sequence diagram according to the embodiment.

Next, an entire operation according to the present embodiment under the aforementioned operation environment will be described. FIG. 9 is an operation sequence diagram according to the present embodiment. In FIG. 9, the case, in which the CB-CoMP has been already started, is mainly assumed.

As illustrated in FIG. 9, in step S1-1, the UE 100-1 transmits feedback information to the eNB 200-1. The feedback information from the UE 100-1 includes CQI, PMI, and BC-PMI. In step S2-1, on the basis of the feedback information from the UE 100-1, the eNB 200-1 updates a statistic for the UE 100-1.

In step S1-2, the UE 100-2 transmits feedback information to the eNB 200-2. The feedback information from the UE 100-2 includes CQI and PMI. In step S2-2, on the basis of the feedback information from the UE 100-2, the eNB 200-2 updates a statistic for the UE 100-2.

As described above, the steps S1 and S2 are a process P1 of mainly updating the statistics for the UE 100-1 and the UE 100-2. Details of the process P1 will be described later.

In step S3, the eNB 200-1 determines to update radio resource assignment of the UE 100-1.

In step S4, the eNB 200-1 generates a message (hereinafter, a "CoMP UE information message") including the statistic calculated in step S2-1.

In step S5, the eNB 200-1 transmits the CoMP UE information message generated in step S4 to the eNB 200-2 via the X2 interface. In the present embodiment, the case, in which the message is transmitted via the X2 interface, will be described. However, the message may be transmitted via the S1 interface As described above, the steps S3 to S5 are a process P2 in which the statistic for the UE 100-1 is notified from the eNB 200-1 to the eNB 200-2. Details of the process P2 will be described later.

In step S6, the eNB 200-2 compares the statistic for the UE 100-1, which was notified in step S5, with the statistic for the UE 100-2 calculated in step S2-2, and performs coincidence determination. Hereinafter, a description will be given on the assumption that it was determined that the statistics coincide with each other.

In step S7, the eNB 200-2 ensures a radio resource (a band) that is assigned to the UE 100-2, and generates a message (hereinafter, an "assignment reservation message") including information on the endured radio resource.

In step S8, the eNB 200-2 transmits the assignment reservation message generated in step S7 to the eNB 200-1 via the X2 interface. In the present embodiment, the case, in which the message is transmitted via the X2 interface, will be described. However, the message may be transmitted via the S1 interface As described above, the steps S6 to S8 are a process P3 in which it is mainly determined whether the statistic for the UE 100-1 coincides with the statistic for the UE 100-2 and a radio resource is ensured and shared when the statistics coincide with each other. Details of the process P3 will be described later.

In step S9, on the basis of the assignment reservation message from the eNB 200-2, the eNB 200-2 determines whether it is possible to continue the CB-CoMP for the UE 100-1. Hereinafter, a description will be given on the assumption that it is possible to continue the CB-CoMP for the UE 100-1.

In step S10-1, on the basis of the assignment reservation message from the eNB 200-2, the eNB 200-1 assigns a radio resource to the UE 100-1.

In step S10-2, the eNB 200-2 assigns a radio resource ensured in step S7 to the UE 100-2.

As described above, the steps S9 and S10 are a process P4 of assigning a radio resource to the UE 100-1 and the UE 100-2. Details of the process P4 will be described later.

(2) Details of Process P1

Figure 10:
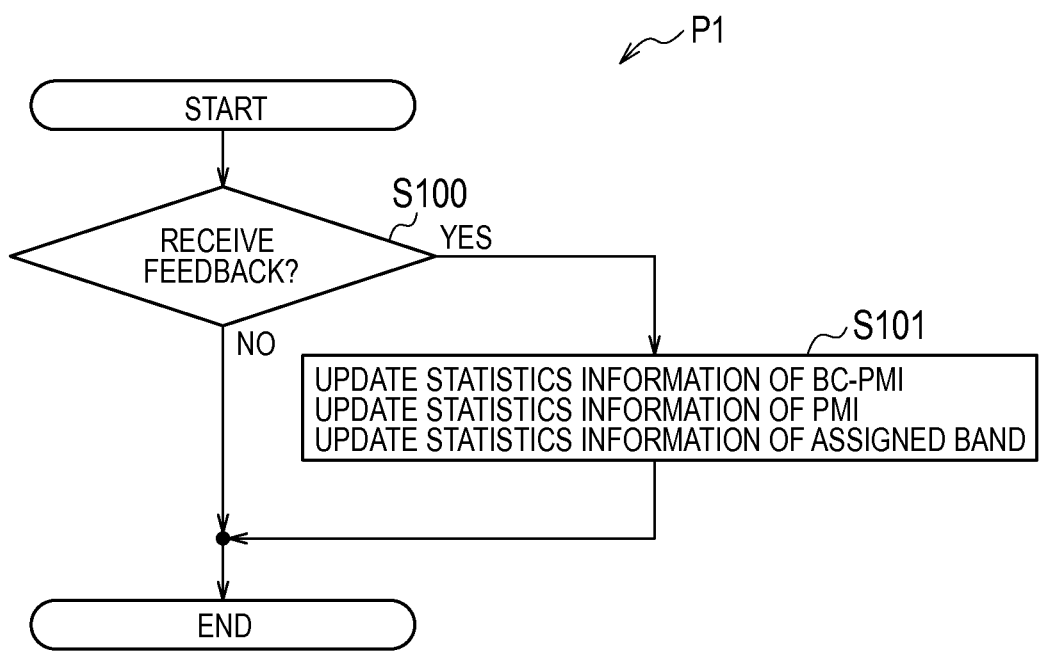
FIG. 10 is a flow diagram illustrating details of a process P1 illustrated in FIG. 9.

Next, details of the process P1 will be described. FIG. 10 is a flow diagram illustrating details of the process P1.

As illustrated in FIG. 10, in step S100, the eNB 200-1 determines whether feedback information was received from the UE 100-1. When the determination result of step S100 is "YES", the eNB 200-1 updates a statistic (a first statistic) for each BC-PMI and a statistic (a second statistic) for each downlink radio resource in step S101.

Furthermore, in step S100, the eNB 200-2 determines whether feedback information was received from the UE 100-2. When the determination result of step S100 is "YES", the eNB 200-2 updates a statistic (a third statistic) for each PMI and a statistic (a fourth statistic) for each downlink radio resource in step S101.

FIG. 11 is a diagram for explaining the statistics according to the present embodiment.

As illustrated in FIG. 11(a), the eNB 200-1 calculates the occurrence probability (the occurrence frequency) for each BC-PMI, which is fed back from the UE 100-1, as the statistic (the first statistic) for each BC-PMI. The total number of BC-PMIs, for example, is equal to the number of all PMIs in a codebook. In a fixed period T, the eNB 200-1 calculates a probability (a ratio) by which each BC-PMI is fed back from the UE 100-1. In this way, it is possible to obtain a distribution of BC-PMIs for the UE 100-1.

As illustrated in FIG. 11(b), the eNB 200-1 calculates an average value of CQIs for each subband, which are fed back from the UE 100-1, as the statistic (the second statistic) for each downlink radio resource. In a fixed period T, the eNB 200-1 calculates the average value of the CQIs, which are fed back from the UE 100-1, for each subband. In this way, it is possible to obtain communication quality for each subband for the UE 100-1.

As illustrated in FIG. 11(c), the eNB 200-2 calculates the occurrence probability (the occurrence frequency) for each PMI, which is fed back from the UE 100-2, as the statistic (the third statistic) for each PMI. In a fixed period T, the eNB 200-2 calculates a probability (a ratio) by which each PMI is fed back from the UE 100-2. In this way, it is possible to obtain a distribution of PMIs for the UE 100-2.

As illustrated in FIG. 11(d), the eNB 200-2 calculates an average value of CQIs for each subband, which are fed back from the UE 100-2, as the statistic (the fourth statistic) for each downlink radio resource. In a fixed period T, the eNB 200-2 calculates the average value of the CQIs, which are fed back from the UE 100-2, for each subband. In this way, it is possible to obtain communication quality for each subband for the UE 100-2.

In addition, in the present embodiment, the average value of the CQIs is used. However, any value indicating the communication quality for each downlink radio resource is substitutable. For example, an average value of throughput corresponding to the CQI may be calculated or the assignment probability (the assignment frequency) for each downlink resource block may also be calculated.

Furthermore, when the values in the fixed periods T in the eNB 200-1 and the eNB 200-2 are different from each other, the fixed period T used in the eNB 200-1 may be notified from the eNB 200-1 to the eNB 200-2. In this case, the fixed period T may be included in the CoMP UE information message. The OAM 400 may designate the fixed period T to each eNB 200.

(3) Details of Process P2

Figure 12:
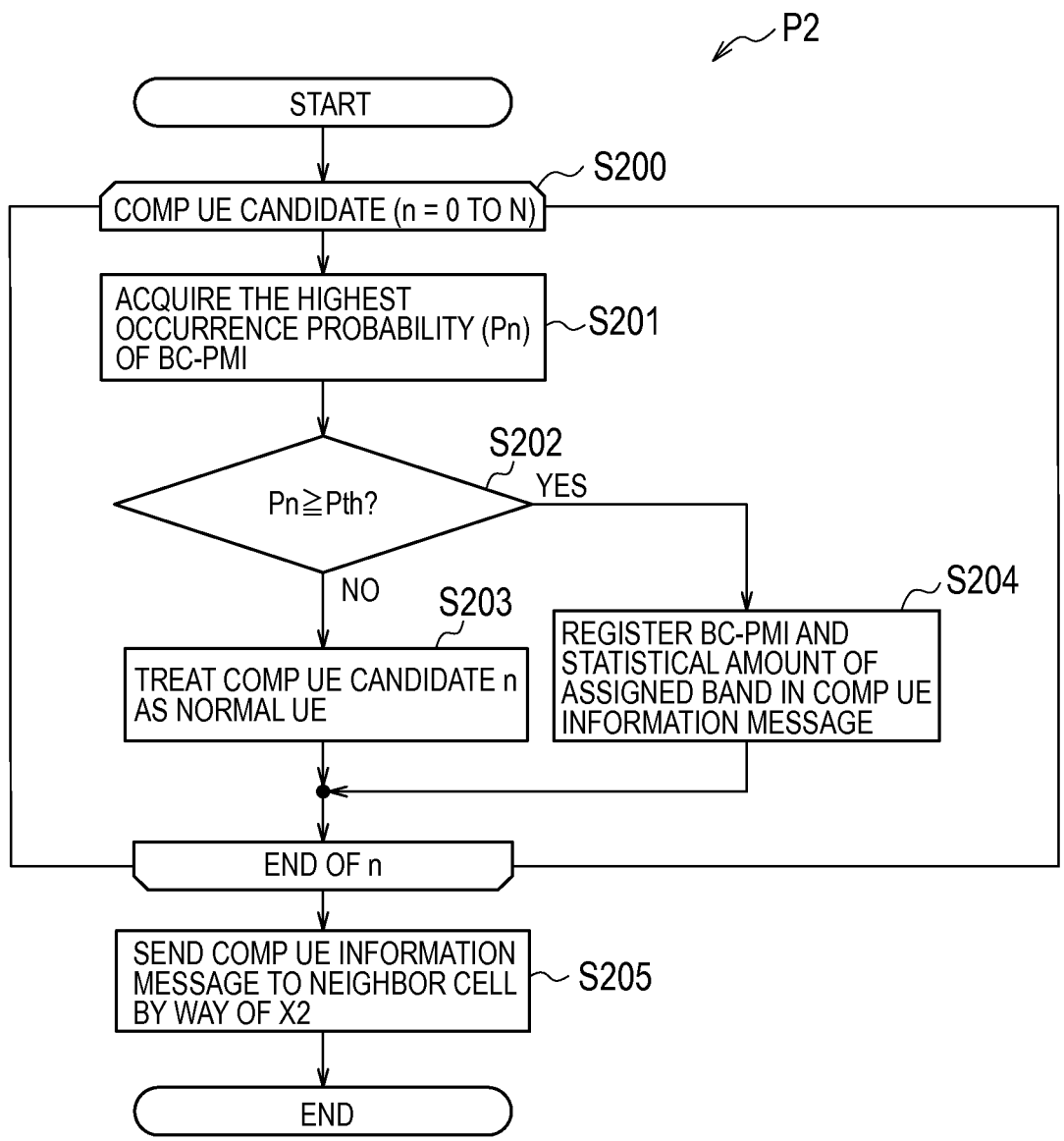
FIG. 12 is a flow diagram illustrating details of a process P2 illustrated in FIG. 9.

Next, details of the process P2 will be described. FIG. 12 is a flow diagram illustrating details of the process P2. Hereinafter, the case, in which a plurality of UEs 100-1 (CoMP UE candidates) are objects of the CB-CoMP, is assumed.

As illustrated in FIG. 12, in step S200, the eNB 200-1 starts processes for each UE 100-1 (each CoMP UE candidate). Specifically, the eNB 200-1 performs processes of steps S201 to S204 for each UE 100-1.

In step S201, the eNB 200-1 acquires the highest occurrence probability Pn in a statistic (an occurrence probability) for each BC-PMI with respect to the target UE 100-1.

In step S202, the eNB 200-1 determines whether the highest occurrence probability Pn is equal to or more than a threshold value Pth. When the highest occurrence probability Pn is equal to or more than the threshold value Pth, it represents that specific BC-PMI is stably fed back from the target UE 100-1. On the other hand, when the highest occurrence probability Pn is smaller than the threshold value Pth, it represents that variation of the BC-PMI fed back from the target UE 100-1 is large.

When the result of step S202 is "Yes", that is, when the target UE 100-1 is suitable for the CB-CoMP, the eNB 200-1 registers a statistic for the target UE 100-1 in the CoMP UE information message in step S204.

When the result of step S202 is "No", that is, when the target UE 100-1 is not suitable for the CB-CoMP, the eNB 200-1 stops the application of the CB-CoMP to the target UE 100-1 and deals with the target UE 100-1 similarly to normal UE in step S203.

After the processes for each UE 100-1 (each CoMP UE candidate) are completed, the eNB 200-1 transmits the CoMP UE information message to the eNB 200-2 via the X2 interface in step S205.

Figure 13:
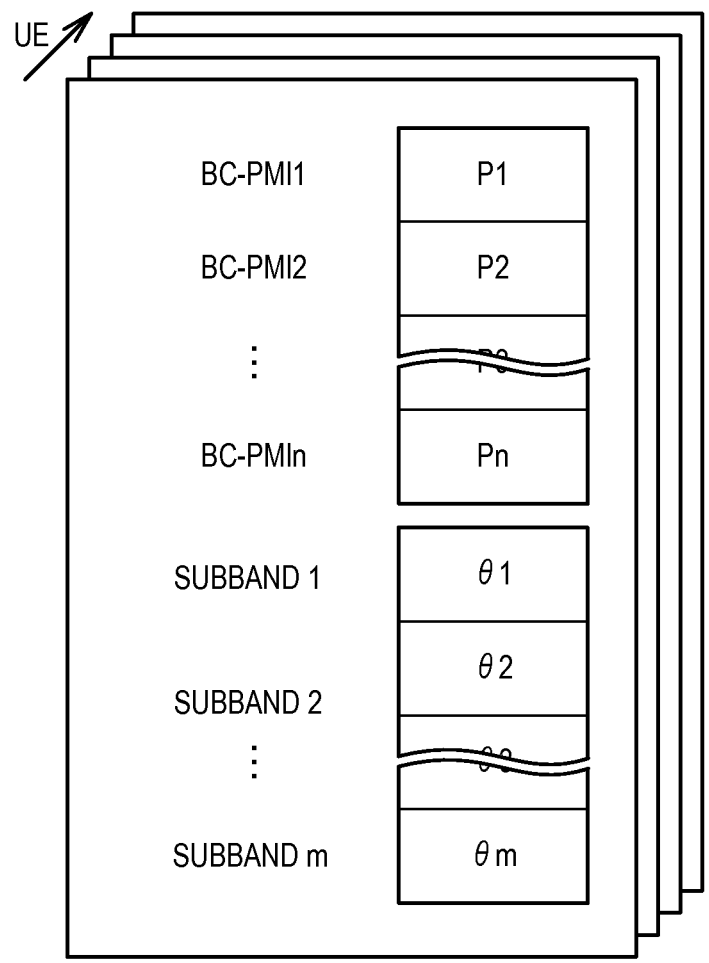
FIG. 13 is a diagram illustrating a configuration example 1 of a CoMP UE information message.

FIG. 13 is a diagram illustrating a configuration example 1 of the CoMP UE information message.

As illustrated in FIG. 13, in the configuration example 1 of the CoMP UE information message, the CoMP UE information message includes the statistic (the first statistic) for each BC-PMI and the statistic (the second statistic) for each downlink radio resource for each selected UE 100-1. As described above, in the configuration example 1, all of the first statistic and all of the second statistic are included in the CoMP UE information message.

Figure 14:
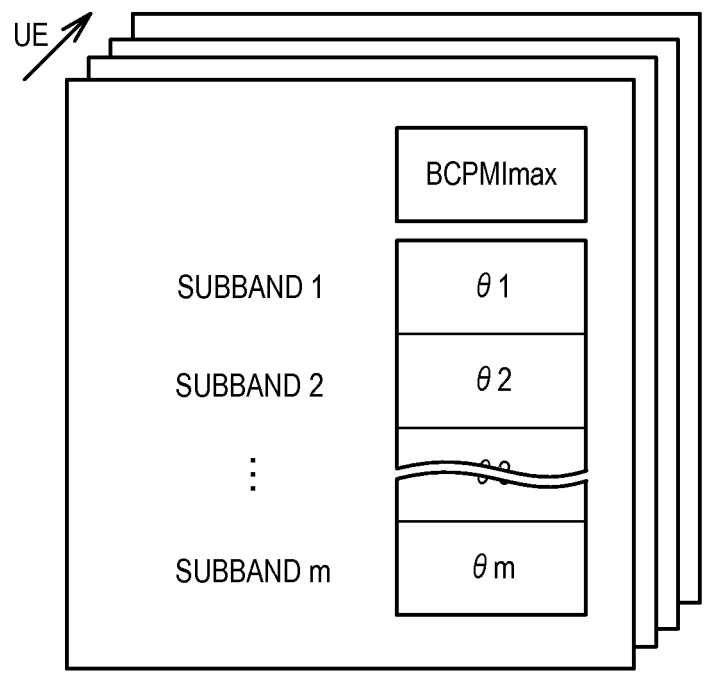
FIG. 14 is a diagram illustrating a configuration example 2 of the CoMP UE information message.

FIG. 14 is a diagram illustrating a configuration example 2 of the CoMP UE information message.

As illustrated in FIG. 14, in the configuration example 2 of the CoMP UE information message, the CoMP UE information message includes the highest statistic (that is, the highest occurrence probability BCPMImax) in the statistic (the first statistic) for each BC-PMI and the statistic (the second statistic) for each downlink radio resource for each selected UE 100-1. As described above, in the configuration example 2, only a part of the first statistic and all of the second statistic are included in the CoMP UE information message.

In addition, as well as the case in which all of the second statistic is included in the CoMP UE information message, only a part (for example, a value with high communication quality) of the second statistic may be included in the CoMP UE information message.

(4) Details of Process P3

Figure 15:
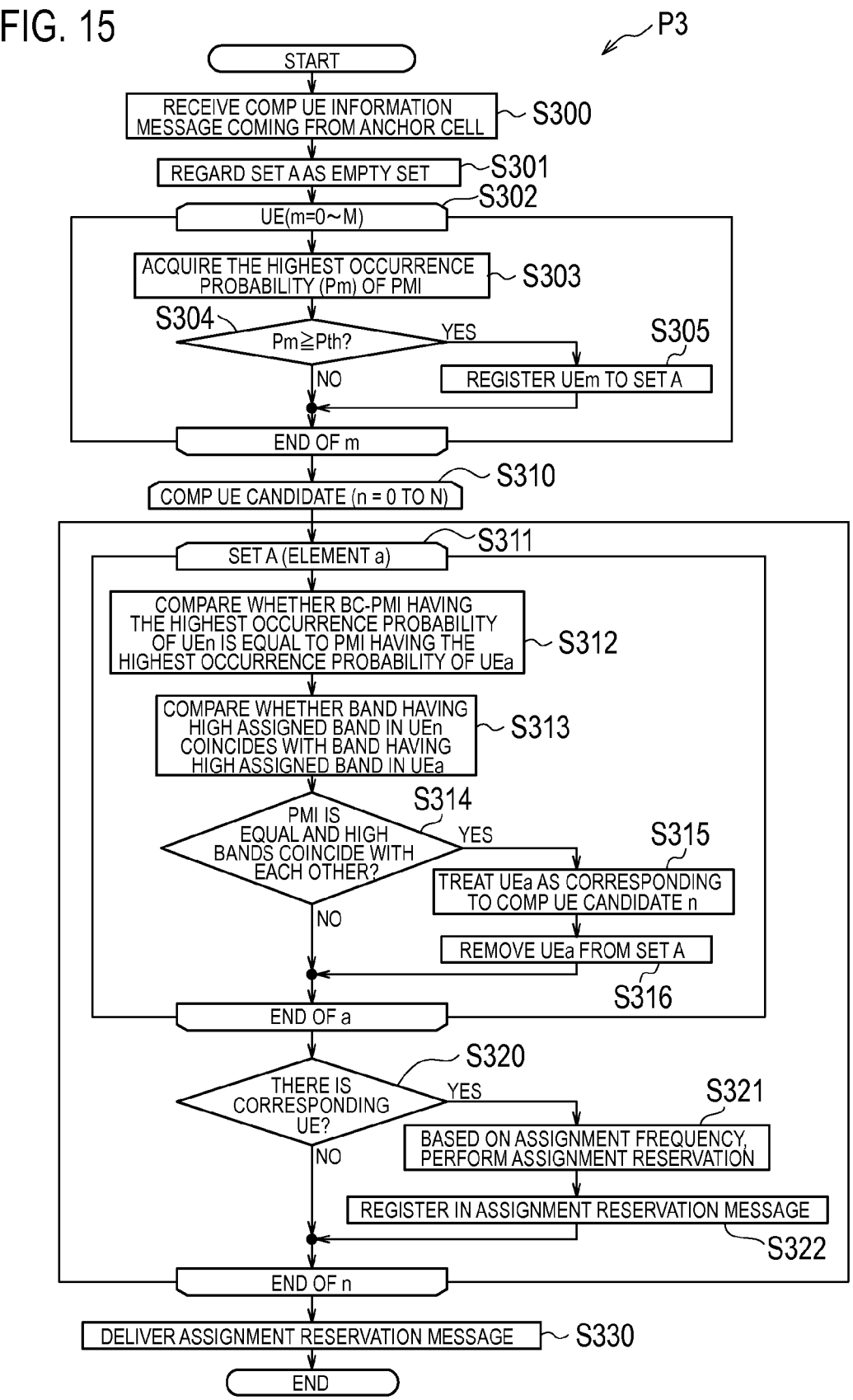
FIG. 15 is a flow diagram illustrating details of a process P3 illustrated in FIG. 9.

Next, details of the process P3 will be described. FIG. 15 is a flow diagram illustrating details of the process P3. Hereinafter, the case, in which a plurality of UEs 100-2 are connected to the eNB 200-2, is assumed.

As illustrated in FIG. 15, in step S300, the eNB 200-2 receives the CoMP UE information message from the eNB 200-1.

In step S301, the eNB 200-2 prepares an empty set A for performing selection from the plurality of UEs 100-2 connected to the eNB 200-2.

In step S302, the eNB 200-2 starts processes for each UE 100-2. Specifically, the eNB 200-2 performs processes of steps S303 to S305 for each UE 100-2.

In step S303, the eNB 200-2 acquires the highest occurrence probability Pm in a statistic (an occurrence probability) for each PMI for target UE 100-2.

In step S304, the eNB 200-2 determines whether the highest occurrence probability Pm is equal to or more than a threshold value Pth. When the highest occurrence probability Pm is equal to or more than the threshold value Pth, it represents that specific PMI is stably fed back from the target UE 100-2. On the other hand, when the highest occurrence probability Pm is smaller than the threshold value Pth, it represents that variation of the PMI fed back from the target UE 100-2 is large.

When the result of step S304 is "Yes", that is, when the target UE 100-2 is suitable for the CB-CoMP, the eNB 200-2 registers the target UE 100-2 in the set A in step S305.

When the result of step S304 is "No", that is, when the target UE 100-2 is not suitable for the CB-CoMP, the eNB 200-2 does not register the target UE 100-2 in the set A.

After the processes for each UE 100-2 are completed, the eNB 200-2 starts processes for each UE 100-1 (each CoMP UE candidate) indicated by the CoMP UE information message in step S310. Specifically, the eNB 200-2 performs processes of steps S311 to S322 for each UE 100-1 (each CoMP UE candidate) indicated by the CoMP UE information message.

In step S311, the eNB 200-2 starts processes for each UE 100-2 indicated by the set A. Specifically, the eNB 200-2 performs processes of steps S312 to S316 for each UE 100-2 indicated by the set A.

In step S312, the eNB 200-2 determines whether BC-PMI with the highest occurrence probability in the first statistic corresponding to the target UE 100-1 is equal to PMI with the highest occurrence probability in the third statistic corresponding to the target UE 100-2. Furthermore, the "equal" indicates that a precoder matrix corresponding to the BC-PMI coincides with a precoder matrix corresponding to the PMI.

In step S313, the eNB 200-2 determines whether a radio resource with high communication quality in the second statistic corresponding to the target UE 100-1 is equal to a radio resource with high communication quality in the fourth statistic corresponding to the target UE 100-2. The "radio resource with high communication quality" indicates a radio resource with relatively high communication quality or a radio resource with communication quality higher than a threshold value.

In step S314, the eNB 200-2 determines whether coincidence was confirmed in any one of step S312 and step S313.

When the determination result of step S314 is "Yes", the eNB 200-2 registers the target UE 100-2 as a pair of the target UE 100-1 in step S315. That is, the eNB 200-2 determines that the target UE 100-2 is able to be spatially multiplexed with the target UE 100-1. Then, in step S316, the eNB 200-2 removes the target UE 100-2 from the set A.

On the other hand, when the determination result of step S314 is "No", the target UE 100-2 is not registered as the pair of the target UE 100-1. That is, the eNB 200-2 determines that the target UE 100-2 is not able to be spatially multiplexed with the target UE 100-1.

After the processes for each UE 100-2 indicated by the set A are completed, the eNB 200-2 determines whether there is UE 100-2 registered as the pair of the target UE 100-1, in step S320.

When the determination result of step S320 is "Yes", the eNB 200-2 ensures (reserves) the radio resource with high communication quality for the CB-CoMP in step S321. Specifically, the eNB 200-2 ensures a radio resource for the UE 100-2, which belongs to the pair of the target UE 100-1 that is an object of the CB-CoMP, from the radio resources coinciding with each other in step S313. Then, in step S322, the ensured radio resource is associated with the target UE 100-1 and is registered in the assignment reservation message.

On the other hand, when the determination result of step S320 is "No", no radio resource for the CB-CoMP is ensured for the target UE 100-1.

After the processes for each UE 100-1 (each CoMP UE candidate) indicated by the CoMP UE information message are completed, the eNB 200-2 transmits the assignment reservation message to the eNB 200-2 via the X2 interface in step S330.

Figure 16:
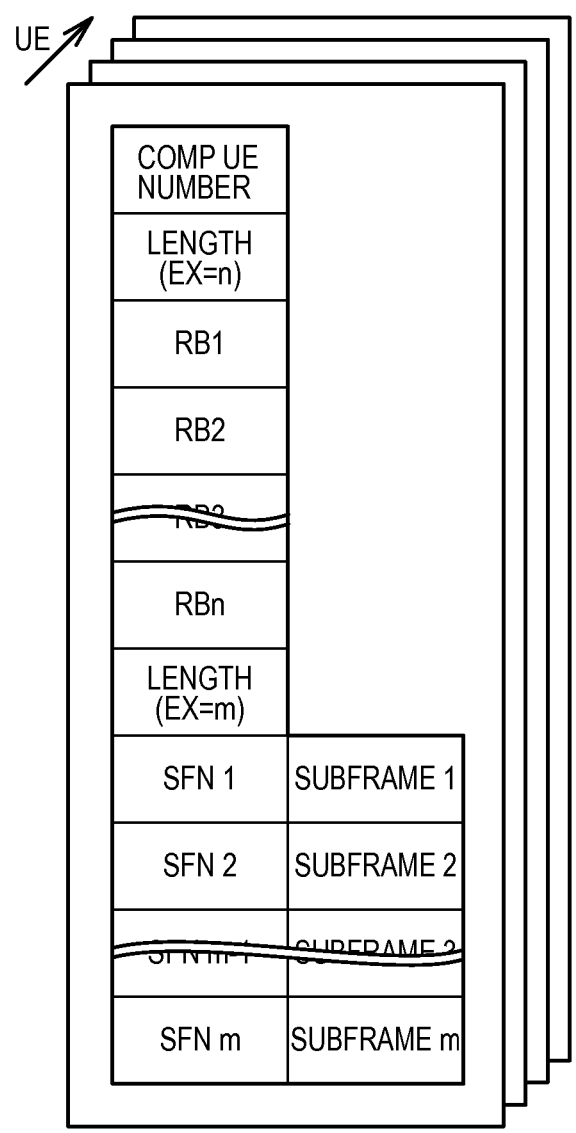
FIG. 16 is a diagram illustrating a configuration example 1 of an assignment reservation message.

FIG. 16 is a diagram illustrating a configuration example 1 of the assignment reservation message.

As illustrated in FIG. 16, in the configuration example 1 of the assignment reservation message, the assignment reservation message includes information (for example, a resource block number) indicating an ensured frequency resource and information (for example, a radio frame number and a subframe number) indicating an ensured time resource for each UE 100-1 to which the CB-CoMP is applied.

Figure 17:
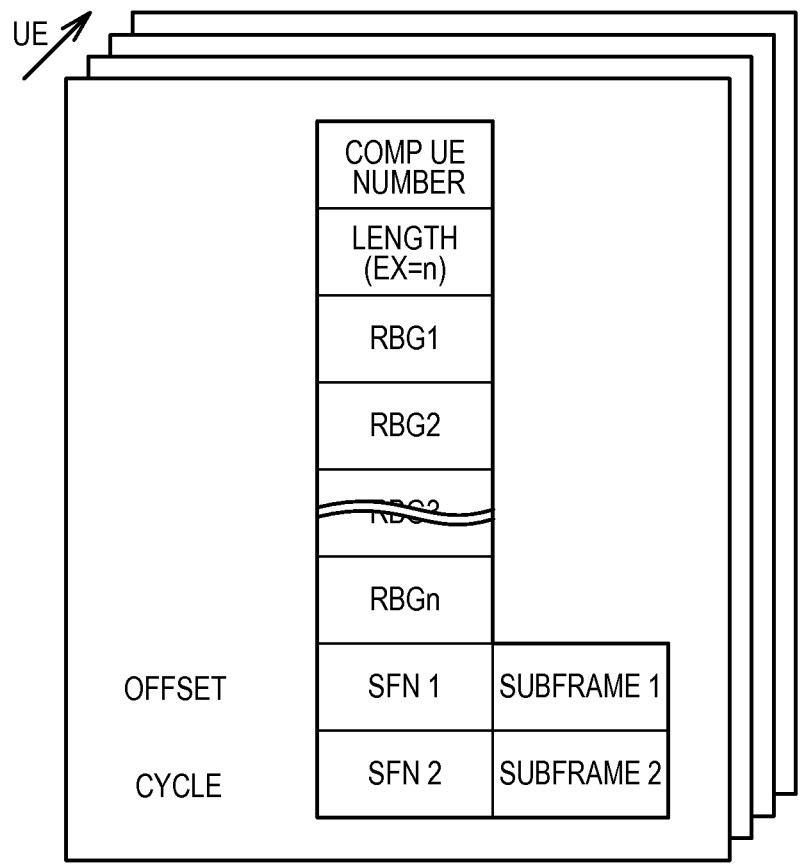
FIG. 17 is a diagram illustrating a configuration example 2 of the assignment reservation message.

FIG. 17 is a diagram illustrating a configuration example 2 of the assignment reservation message.

As illustrated in FIG. 17, in the configuration example 2 of the assignment reservation message, information indicating an ensured time resource is different from that of the configuration example 1. Specifically, the information indicating the ensured time resource includes information (for example, a radio frame number and a subframe number) indicating an assignment start timing and information (for example, a radio frame number and a subframe number) indicating an assignment cycle. In this case, when the assignment start timing is set as T1 (SFN1, a subframe1), an assignment timing is determined by Tcurrent mod T2 (=SFN2×10+psubframe2)=T1 (=SFN1×10+subframe1).

(5) Details of Process P4

Next, details of the process P4 will be described. FIG. 18 is a flow diagram illustrating details of the process P4.

As illustrated in FIG. 18, in step S400, the eNB 200-1 receives the assignment reservation message from the eNB 200-2.

In step S410, the eNB 200-1 starts processes for each UE 100-1 (each CoMP UE candidate). Specifically, the eNB 200-1 performs processes of steps S411 to S414 for each UE 100-1.

In step S411, the eNB 200-1 searches for assignment information of the target UE 100-1 from the assignment reservation message.

In step S412, the eNB 200-1 determines whether the assignment information of the target UE 100-1 exists in the assignment reservation message.

When the determination result of step S412 is "Yes", the eNB 200-1 registers assignment reservation of an ensured radio resource corresponding to the target UE 100-1 in step S414.

On the other hand, when the determination result of step S412 is "No", the eNB 200-1 regards that the target UE 100-1 was excluded from an object of the CB-CoMP and deals with the target UE 100-1 as normal UE in step S413.

Conclusion

As described above, in the present embodiment, the LTE system, which includes the eNB 200-1, the UE 100-1 that is connected to the eNB 200-1, the eNB 200-2 that is adjacent to the eNB 200-1, and the UE 100-2 that is connected to the eNB 200-2, performs the CB-CoMP for the UE 100-1 and the UE 100-2 by applying the same radio resource and the same precoder matrix.

In the present embodiment, the eNB 200-1 calculates the first statistic for each BC-PMI, which is fed back from the UE 100-1, and the second statistic for each downlink radio resource in the UE 100-1, and notifies the eNB 200-2 of the first statistic and the second statistic. The eNB 200-2 calculates the third statistic for each PMI, which is fed back from the UE 100-2, and the fourth statistic for each downlink radio resource in the UE 100-2. Then, the eNB 200-2 compares the first statistic with the third statistic and compares the second statistic with the fourth statistic, thereby determining whether the CB-CoMP is possible.

In this way, from the standpoint of a feedback situation of the BC-PMI/the PMI and a situation of the downlink radio resource, it is checked that the UE 100-1 and the UE 100-2 are a pair with high consistency (a pair with high compatibility), and then it is possible to perform the CB-CoMP. Consequently, it is possible to obtain an effect that performance is more reliably improved due to the CB-CoMP.

On the other hand, from the standpoint of the feedback situation of the BC-PMI/the PMI and the situation of the downlink radio resource, when the UE 100-1 and the UE 100-2 are a pair with low consistency (a pair with low compatibility), it is not possible to perform the CB-CoMP. Consequently, it is possible to prevent performance deterioration from occurring due to the CB-CoMP.

In the present embodiment, the first statistic indicates the occurrence probability for each BC-PMI. The third statistic indicates the occurrence probability for each PMI. When BC-PMI with the highest occurrence probability in the first statistic does not coincide with PMI with the highest occurrence probability in the third statistic, the eNB 200-2 determines that the CB-CoMP is not possible. In this way, from the standpoint of the feedback situation of the BC-PMI/the PMI, when the consistency of the UE 100-1 and the UE 100-2 is low, it is not possible to perform the CB-CoMP.

In the present embodiment, the second statistic indicates the communication quality for each downlink radio resource in the UE 100-1. The fourth statistic indicates the communication quality for each downlink radio resource in the UE 100-2. When a radio resource with high communication quality in the second statistic does not coincide with a radio resource with high communication quality in the fourth statistic, the eNB 200-2 determines that the CB-CoMP is not possible. In this way, from the standpoint of the situation of the downlink radio resource, when the consistency of the UE 100-1 and the UE 100-2 is low, it is not possible to perform the CB-CoMP.

In the present embodiment, when it is determined that the CB-CoMP is possible, the eNB 200-2 ensures a radio resource for the CB-CoMP and notifies the eNB 200-1 of the ensured radio resource. Then, the eNB 200-2 assigns the ensured radio resource to the UE 100-2 and the eNB 200-1 assigns, to the UE 100-1, the radio resource notified from the eNB 200-2. In this way, it is possible to appropriately perform the CB-CoMP by using the same radio resource.

In the present embodiment, when the highest occurrence probability in the first statistic is smaller than a threshold value or when the highest occurrence probability in the third statistics is smaller than the threshold value, it is determined that the CB-CoMP is not possible. In this way, it is possible to exclude UE 100, which is not suitable for the CB-CoMP, from an object of the CB-CoMP.

In the present embodiment, the eNB 200-2 calculates the third statistic and the fourth statistic for each of the plurality of UEs 100-2 that are connected to the eNB 200-2, and determines whether the CB-CoMP with the UE 100-1 is possible for each of the plurality of UEs 100-2. In this way, it is possible to search for UE 100-2 with high consistency with the UE 100-1.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

In the aforementioned embodiment, when a probability, by which the BC-PMI fed back from the UE 100-1 coincides with PMI fed back from the UE 100-2, is high, it is determined that the CB-CoMP is applicable. However, when WC (Worst Companion)-PMI is used instead of the aforementioned BC-PMI, a determination technique is changed. Furthermore, the WC-PMI is information (an index) indicating a precoder matrix in which a beam is directed toward the UE 100-1 at the time of transmission from the eNB 200-2 to the UE 100-1. In the case of using the WC-PMI, when a probability, by which the WC-PMI fed back from the UE 100-1 does not coincide with PMI fed back from the UE 100-2, is high, it is possible to determine that the CB-CoMP is applicable.

Furthermore, the aforementioned embodiment has described the case in which it is determined whether to continue the CB-CoMP. However, the present invention can also be applied to determination regarding whether to start the CB-CoMP.

The entire contents of U.S. Provisional Application No. 61/723,020 (filed on Nov. 6, 2012) are incorporated herein by reference.

INDUSTRIAL APPLICABILITY

The present invention is useful for mobile communications field.

The invention claimed is:
1. A communication control method comprising:
calculating, by a first base station, a first statistic for each piece of first precoder matrix information fed back from a first user terminal and a second statistic for each downlink radio resource in the first user terminal;
notifying, by the first base station, a second base station of the first statistic and the second statistic;
calculating, by the second base station, a third statistic for each piece of second precoder matrix information fed back from a second user terminal and a fourth statistic for each downlink radio resource in the second user terminal; and
comparing, by the second base station, the first statistic with the third statistic, comparing the second statistic with the fourth statistic, and determining whether a spatial multiplexing transmission applying a same radio resource and a same precoder matrix to the first user terminal and the second user terminal is possible.
2. The communication control method according to claim 1, wherein
the first statistic indicates an occurrence probability for each piece of first precoder matrix information,
the third statistic indicates an occurrence probability for each piece of second precoder matrix information, and
when the piece of first precoder matrix information with the highest occurrence probability in the first statistic does not coincide with the piece of second precoder matrix information with the highest occurrence probability in the third statistic, the second base station determines that the spatial multiplexing transmission is not possible.
3. The communication control method according to claim 2, wherein the second base station determines that the spatial multiplexing transmission is not possible when the highest occurrence probability in the first statistic is smaller than a threshold value or when the highest occurrence probability in the third statistic is smaller than the threshold value.

4. The communication control method according to claim 1, wherein
the second statistic indicates communication quality for each downlink radio resource in the first user terminal,
the fourth statistic indicates communication quality for each downlink radio resource in the second user terminal, and
when a downlink radio resource with high communication quality in the second statistic does not coincide with a downlink radio resource with high communication quality in the fourth statistic, the second base station determines that the spatial multiplexing transmission is not possible.

5. The communication control method according to claim 1, wherein
when the spatial multiplexing transmission is determined to be possible,
the second base station ensures a radio resource for the spatial multiplexing transmission and notifies the first base station of the ensured radio resource,
the second base station assigns the ensured radio resource to the second user terminal, and
the first base station assigns the ensured radio resource, which has been notified from the second base station, to the first user terminal.

6. The communication control method according to claim 1, wherein
the second base station calculates the third statistic and the fourth statistic for each of a plurality of second user terminals connected to the second base station, and
the second base station determines whether the spatial multiplexing transmission with the first user terminal is possible for each of the plurality of second user terminals.

* * * * *